May 27, 1930.   S. KLEIN   1,759,856
DRIVING AND SPEED VARYING MECHANISM
Filed Feb. 3, 1928   2 Sheets-Sheet 1
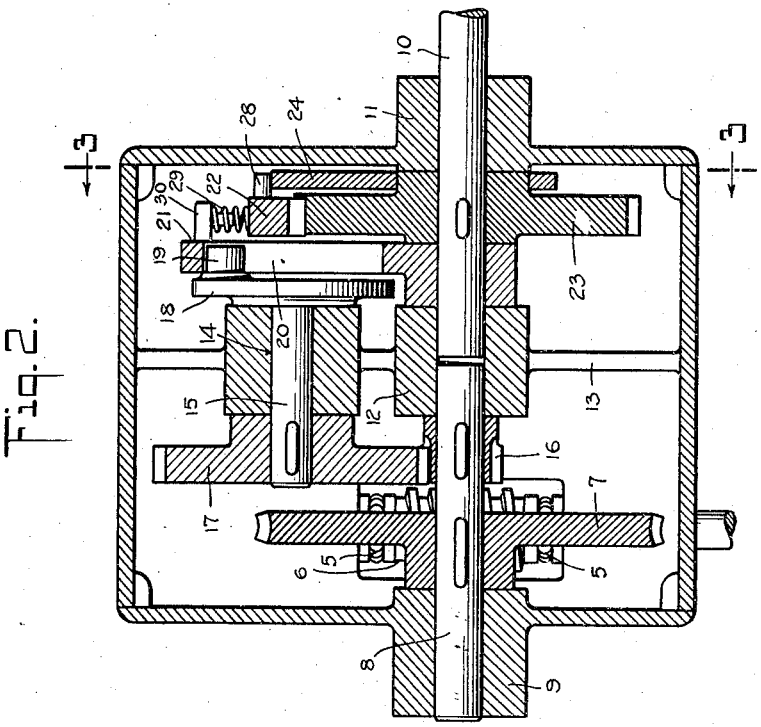
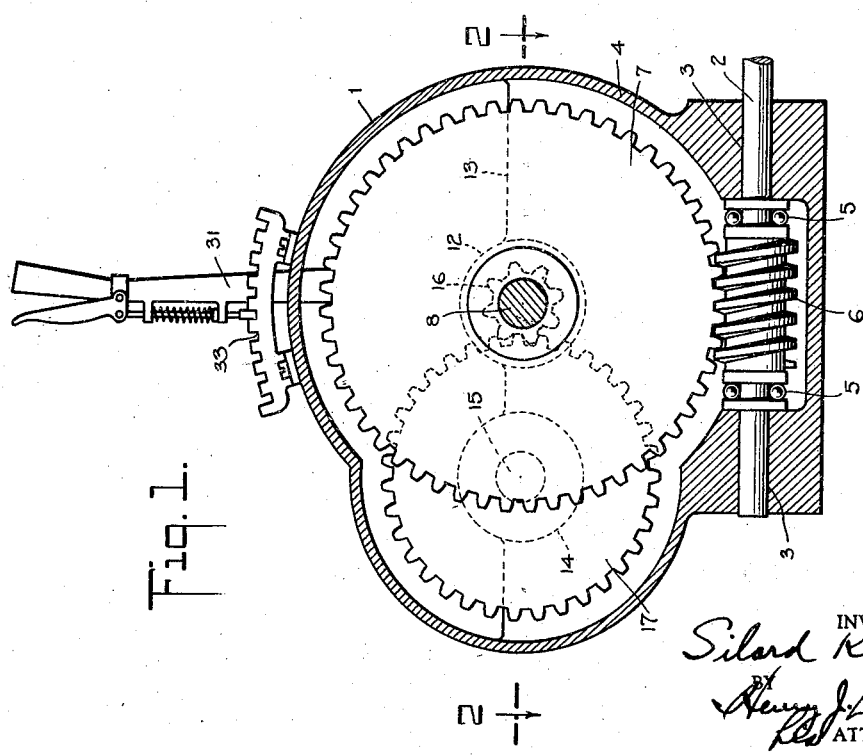

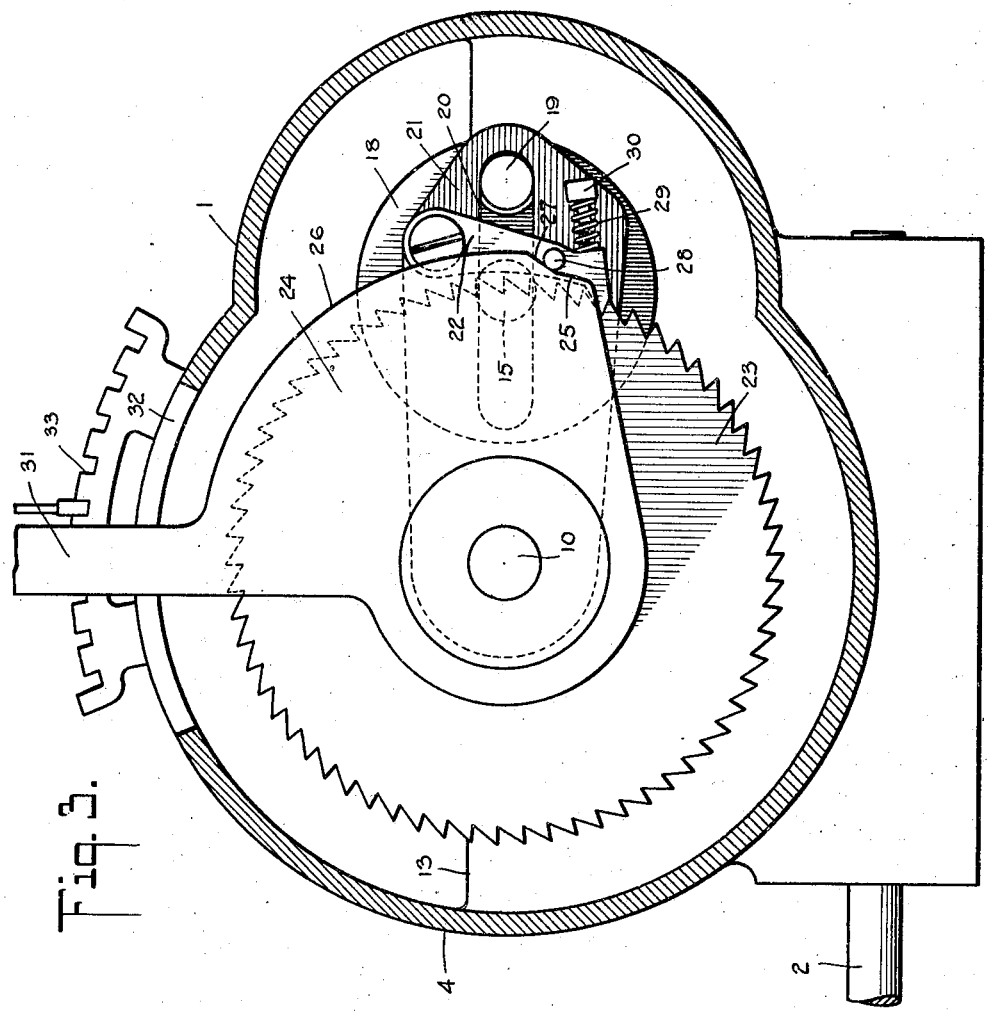

Patented May 27, 1930

1,759,856

UNITED STATES PATENT OFFICE

SILARD KLEIN, OF NEW YORK, N. Y.

DRIVING AND SPEED-VARYING MECHANISM

Application filed February 3, 1928. Serial No. 251,529.

My invention relates to new and improved means for impelling a driven member at a reduced speed or rate in relation to that of a driving member, and means for varying the rate of driving.

More particularly, the object is to greatly reduce the rate of movement of the driven member in relation to that of the driver, to provide for intermittent propulsion of the driven member; and further, to control the rate or amount of movement of the driven member at each impulse, this control being so arranged that the total ratio between the driving and driven members is capable of a great range of variations from maximum to minimum.

The mechanism also includes other novel or improved combinations or arrangements of parts as sufficiently explained in the following detail description of the accompanying drawings, which show one representative embodiment of the invention. After considering this example, skilled persons will understand that many variations may be made, and I contemplate the employment of any structures that are properly within the scope of the appended claims.

Fig. 1 is an end elevation of mechanism embodying the invention in one form.

Fig. 2 is a horizontal section at 2—2 of Fig. 1.

Fig. 3 is a section at 3—3 of Fig. 2.

The structure is capable of substantial modifications as to details, or arrangement of parts, the form chosen for illustration being preferred in some cases.

The mechanism is enclosed in a box or casing 1 which is made in parts to admit ready assembly, inspection or repair, the details of the housing being largely variable. A drive shaft 2 impelled from any suitable source of power is mounted in bearings 3 at the bottom of the main portion 4 of the casing. On this shaft, between thrust bearings 5, is a worm 6 engaging a worm gear 7 mounted on a shaft 8, which is mounted in an end bearing 9. Shaft 8 is aligned with the driven shaft 10, the outward end of which projects through the casing for connection in any desired way to the mechanism to be driven.

The driving shaft is supported by an outer bearing 11, and shafts 8 and 10 have their inner ends mounted for independent rotation in a central bearing 12, supported by a web 13, which also supports a central bearing 14 for a countershaft 15.

A pinion 16 fixed on shaft 8 engages a gear 17 fixed on the countershaft. Desirably, the pinion is as shown of much smaller diameter than its gear to give a substantial ratio reduction, and also the drive ratio of worm 6 to its worm wheel 7 is selected to give a great reduction of driving speed; so that by the two successive speed reductions, the countershaft is driven very slowly in relation to the speed of the driving shaft, this ratio of course, being variable by proper selection of the respective gear ratios.

On the countershaft at one end of the bearing 14 is a disk 18 having an eccentric driving pin 19 engaging in the slot 20 of a rocker 21, mounted to oscillate freely about the driven shaft. A pawl 22 pivotally mounted on the rocker engages the teeth of a ratchet wheel 23 fixed on the driven shaft. A controlling member, otherwise referred to as a cam plate, 24, is arranged for oscillation upon the driven shaft or upon an inward extension of the bearing 11. This controlling member has a cam formation on its upper end, including a concentric portion 25, and another longer concentric portion 26, these portions being connected by an eccentric or angular portion 27. The pawl 22 has a stud 28 to co-operate with the cam, and is urged in a direction to engage the ratchet wheel by a spring 29, compressed between the pawl and a lug 30 on the rocker. The cam plate has an extension 31 in the form of a lever extending through a slot 32 in the casing, and provided with any suitable latch to engage teeth 33 on the casing or formed on a sector attached thereto. In operation, disk 18 is revolved at a constant rate, at very low speed in relation to that of the driving shaft 8, by the double reduction gear train above described. Driving pin 19 on the disk moving in slot 20 of the rocker oscillates the rocker 21. To give the lowest final driving rate of speed, or the least rotary movement of the driven shaft 10 at each oscillation of the rocker, the control lever 31 is placed in the notch next to the one on the extreme right hand position as viewed in Fig. 3. When rocker 21 is in a position above that shown in Fig. 3, the pin 28 of pawl 22 rests on the concentric cam surface 26 of largest radius and the tooth of the pawl is thus held out of engagement with the teeth of wheel 23 during the greater part of the downward stroke of the rocker and until pin 28 reaches the eccentric cam portion 27 whereupon the pawl engages a tooth of wheel 22. The cam is so designed that when the lever is in the stated position the pawl will move after engaging the wheel tooth a distance equal to only one tooth space. The driven shaft 10 is thus moved that fraction of a rotation corresponding to $\frac{1}{n}$ where $n$ represents the number of teeth in wheel 23. Evidently by moving the lever 31 farthest to the right as viewed in Fig. 3 propulsion of the driven shaft will be entirely prevented since in that case the pawl will be held out of engagement with its wheel throughout the effective arcuate movement of the rocker, and therefore the wheel and the driven shaft will not be moved. The control mechanism thus provides for complete interruption and resumption of driving when desired.

By moving the lever progressively toward the left from the position first stated the pawl will have progressively greater effective travel or range of movement, that is for each positioning of the lever the pawl will be permitted to move inward and engage a tooth of wheel 23 at a different point, thus utilizing a greater portion of the arcuate movement of rocker 21 to propel the wheel and driven shaft a larger fraction of a revolution at each oscillation of the rocker. The range of variation of driving ratios depends upon the amplitude of movement of the rocker which may be varied substantially within reasonable limits.

When the parts are proportioned substantially as shown, the range of variation is approximately in the proportion of 1 to 8, that is in one extreme position of the lever the driven member will be moved at each impulse a distance corresponding to only one tooth space of wheel 23, while with the lever in the other extreme position the driven member will be moved a distance equal to eight tooth spaces. This particular range of variation is stated only by way of example and evidently it may be varied substantially in ways above mentioned or otherwise.

Since the invention provides for the movement of a driven member only a part of a rotation at each impulse, and further provides in the double reduction the train of gearing for the very slow oscillation of the rocker which produces the final driving impulse, the described mechanism is well adapted to any situation in which a driven machine or member such as a conveyor is to be moved relatively slowly and also intermittently and with a substantial pause between each movement. The invention mechanism is capable of an indefinite number of applications or adaptations and therefore no attempt is made to specify particularly its field of utility.

I claim:

1. Mechanism of the class described, comprising a driving shaft, a worm thereon, a worm gear engaging the worm, a second shaft on which the worm gear is mounted, a driven shaft aligned with the second shaft and independently revoluble, a countershaft, a pinion on the second shaft, a gear on the countershaft engaging the pinion, a driving stud supported to rotate with the countershaft at a substantial radial distance from the countershaft axis, a rocker provided with a slot in which the driving stud is located to effect oscillation of the rocker, a ratchet wheel on the driven shaft, and a pawl on the rocker co-operating with the ratchet wheel.

2. Mechanism of the class described, comprising a driving shaft, a worm thereon, a worm gear engaging the worm, a second shaft on which the worm gear is mounted, a driven shaft aligned with the second shaft and independently revoluble, a countershaft, a pinion on the second shaft, a gear on the countershaft engaging the pinion, a driving stud supported to rotate with the countershaft at a substantial radial distance from the countershaft axis, a rocker provided with a slot in which the driving stud is located to effect oscillation of the rocker, a ratchet wheel on the driven shaft, a pawl on the rocker co-operating with the ratchet wheel, and a cam plate mounted for oscillation about the driven shaft axis.

3. Mechanism of the class described, comprising a driving shaft, a worm thereon, a worm gear engaging the worm, a second shaft on which the worm gear is mounted, a driven shaft aligned with the second shaft and independently revoluble, a countershaft, a pinion on the second shaft, a gear on the countershaft engaging the pinion, a driving stud supported to rotate with the countershaft at a substantial radial distance from the countershaft axis, a rocker provided with a slot in which the driving stud is located to effect oscillation of the rocker, a ratchet wheel on the driven shaft, a pawl on the rocker co-operating with the ratchet wheel, and means for controllably retaining the pawl in inoperative position for variable parts of its travel whereby to control the effective arc of propulsion of the ratchet wheel by the pawl at each oscillation.

4. Mechanism of the class described, comprising a driving shaft, a worm thereon, a worm gear engaging the worm, a second shaft on which the worm gear is mounted, a driven shaft aligned with the second shaft and independently revoluble, a countershaft, a pinion on the second shaft, a gear on the countershaft engaging the pinion, a driving stud supported to rotate with the countershaft at a substantial radial distance from the countershaft axis, a rocker provided with a slot in which the driving stud is located to effect oscillation of the rocker, a ratchet wheel on the driven shaft, a pawl on the rocker cooperating with the ratchet wheel, and a cam plate mounted for oscillation about the driven shaft axis and having a peripheral formation co-operating with the pawl to control engagement of the pawl with the ratchet wheel and thus controllably vary the arc of movement of the driven shaft at each oscillation of the rocker.

In testimony whereof I have signed this specification this 16th day of December, 1927.

SILARD KLEIN.